UNITED STATES PATENT OFFICE.

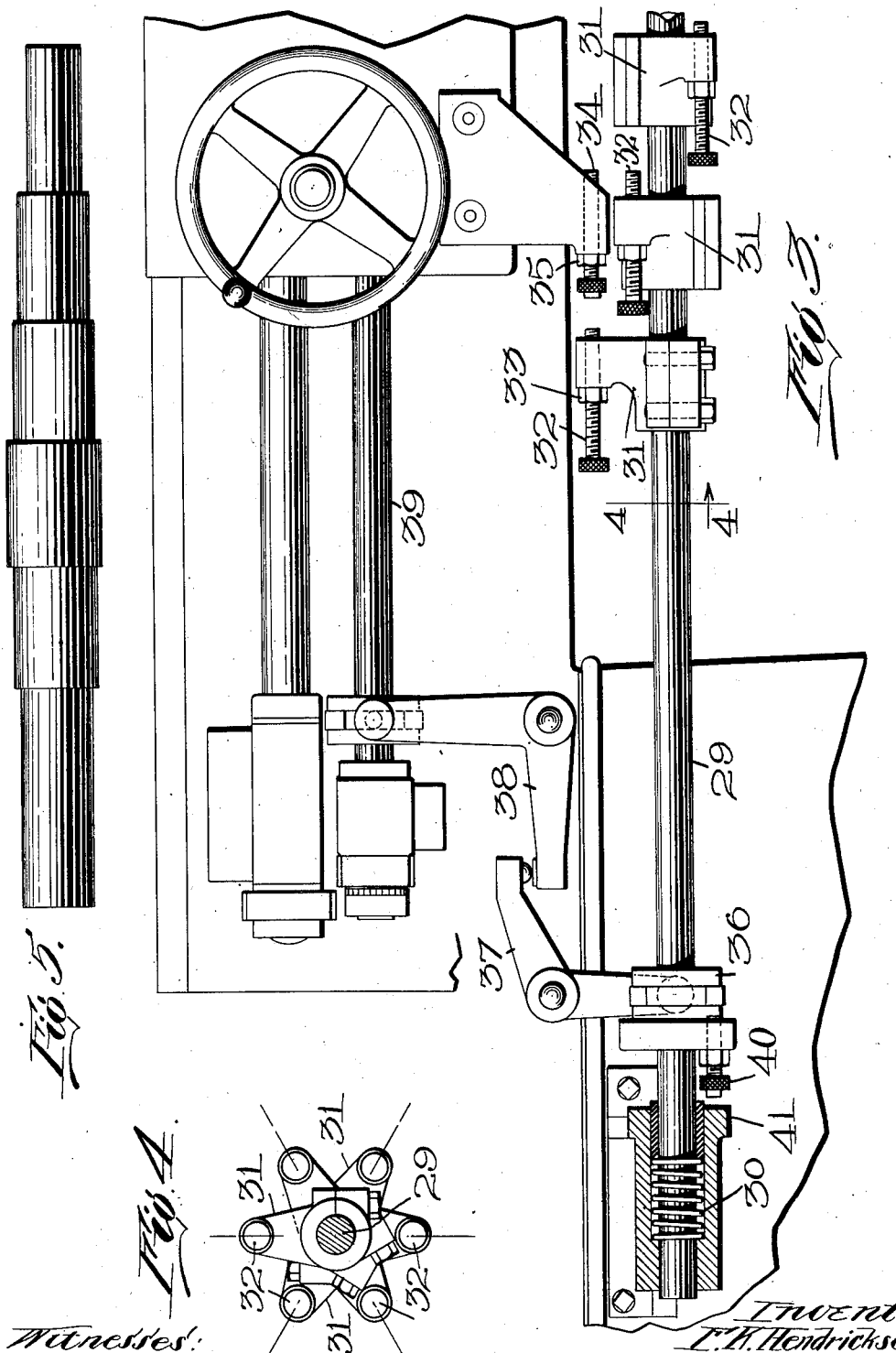

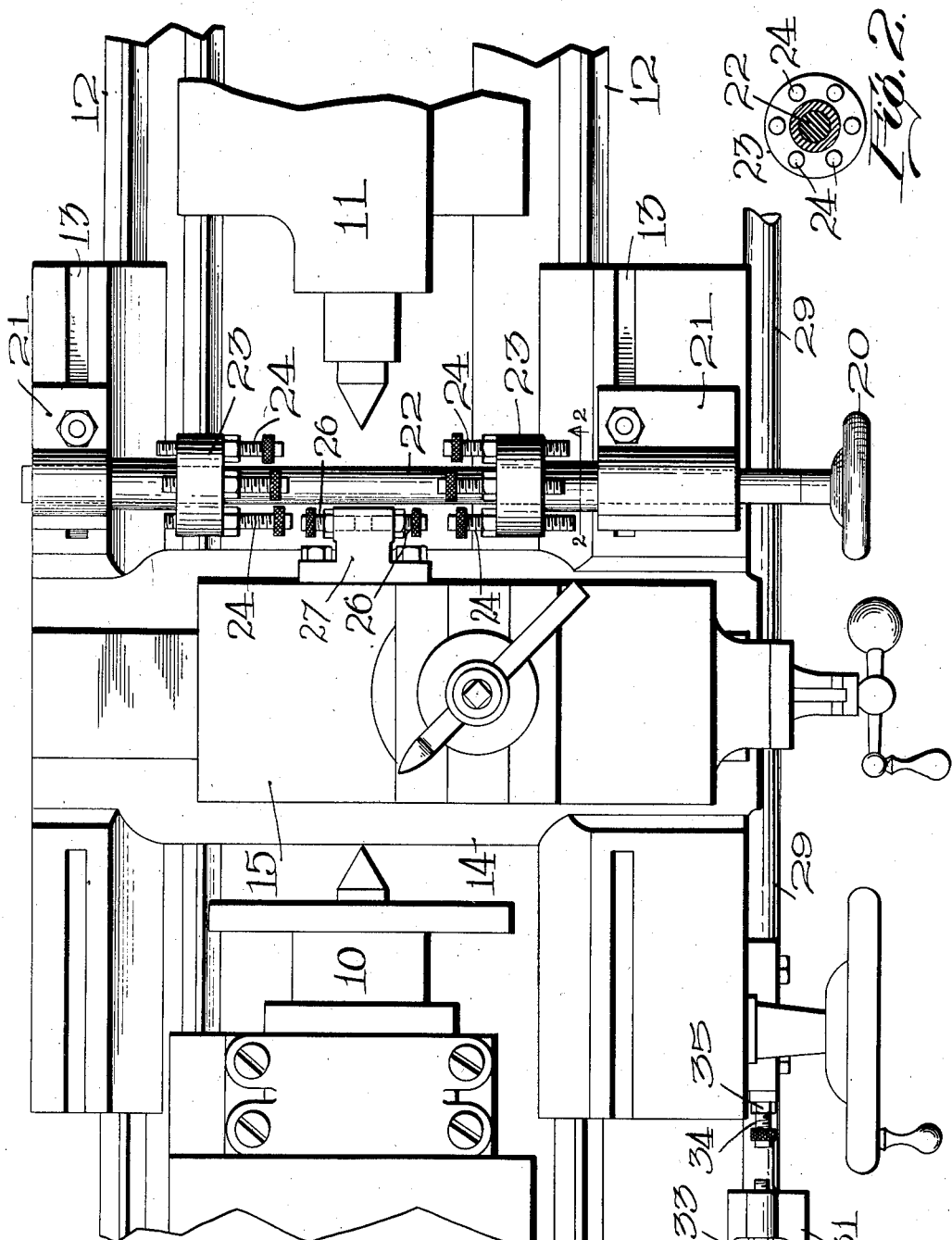

FRED K. HENDRICKSON, OF WORCESTER, MASSACHUSETTS, ASSIGNOR, BY MESNE ASSIGNMENTS, TO REED-PRENTICE COMPANY, OF WORCESTER, MASSACHUSETTS, A CORPORATION OF MASSACHUSETTS.

MACHINE FOR TURNING MULTIPLE-DIAMETER SHAFTS.

1,050,828. Specification of Letters Patent. Patented Jan. 21, 1913.

Application filed April 12, 1911. Serial No. 620,565.

*To all whom it may concern:*

Be it known that I, FRED K. HENDRICKSON, a citizen of the United States, residing at Worcester, in the county of Worcester and State of Massachusetts, have invented a new and useful Machine for Turning Multiple-Diameter Shafts, of which the following is a specification.

This invention relates to a novel means for controlling the turning of multiple diameter shafts and the like without making any measurements after the machine is first set to the first of said shafts.

The principal objects of the invention are to provide a construction suitable for application to lathes, particularly high speed lathes, for securing this result; also to provide a construction for this purpose of a simple character and one which can be very easily manipulated and in which if the tool is removed, as for grinding, the several stops required will not have to be reset but the tool support can be adjusted properly with respect to one of them and will then be in proper position for all.

Further objects and advantages of the invention will appear hereinafter.

Reference is to be had to the accompanying drawings, in which,

Figure 1 is a plan of a portion of a high speed geared head lathe with a preferred embodiment of the invention applied thereto. Fig. 2 is a sectional view of a detail thereof on line 2—2 of Fig. 1. Fig. 3 is a side view of a portion shown in Fig. 1. Fig. 4 is a sectional view on the line 4—4 of Fig. 3, and Fig. 5 is a plan of a multiple diameter shaft that can be turned on a lathe provided with this attachment.

The invention is shown as applied to a high speed geared head lathe having a head stock 10, tail stock 11, ways 12 and T-slots 13 in the front and rear projections on the regular longitudinally movable carriage 14 and transversely adjustable slide 15. Fixed in these T-slots by headed bolts are front and rear stands 21 having bearings for a transverse shaft 22, which is rotatable by a hand wheel 20, but is not longitudinally movable. On this shaft are securely fixed two drums or dogs 23, one at the front and one at the rear. Each of these drums is provided with a plurality of adjustable screws 24, six being shown in the present instance, arranged in a circle about the shaft. These adjusting screws as will appear, act as diameter gages when once set for the first shaft. They constitute front and rear stops, respectively. The object of having both front and rear stops is to provide for a wide range of diameters, the six rear screws being used for small diameter work and the six front screws for large diameter or internal work.

Adjustable stop screws 26 are located on a projection 27 on the tool slide. The stop screws 26 are at the same distance from the center of the shaft 22 as the screws 24.

The shaft 22 is turned by means of a hand wheel 20 so as to bring any desired stop up into position to engage the stop screws 26, and the carriage is moved up until they come into close contact. Then the work is turned to that diameter. Then the shaft 22 is turned to another stop and so on. The stop screw 26 coming in contact with these various diameter stops exactly governs the required diameters. Having been properly set by measurement to secure the proper turning of the first shaft and that shaft having been gaged to show its accuracy, these stops do not have to be further manipulated except when the tool is removed. In that case when the stop screw 26 is adjusted into proper position with respect to one of the stops 24 everything is right, to obtain the proper turning of the shaft. It will be observed that these stops are not in any way automatic but are positive and accurate.

In order to control the length of each portion of the multiple diameter shaft or the like which is to be turned, a longitudinal shaft 29 is mounted at the front of the lathe directly below the apron. It is movable longitudinally against the pressure of the spring 30 which returns it to normal position after each operation. On this shaft a plurality of stop dogs 31 are mounted, each one being adjustable along the shaft. Each one is provided with a fine screw 32 so that it is only necessary to bind each dog approximately to the required position, the finer adjustments being obtained by means of the adjusting screws 32, which when once set are securely locked by check nuts 33. The dog shaft of course is rotatably mounted in rigid bearings securely fastened to the lathe. The apron arm imparts its lateral motion to the stop dog in position for engagement through an adjustable screw 34 held by a check nut 35. Motion is transmitted from the shaft 29 through a collar 36, bell-crank levers 37 and 38 to the end of the feed rod 39 which operates the regular stop motion clutch as will be understood. This action releases the clutch of course and leaves the work rotating and the tool stops its cutting operation but is still in position so that the apron can be fed up by the usual hand wheel still harder against the dog until the adjustable screw 40 in the collar 36 comes hard up against the finished end of the bearing 41. This insures accurate length measurement for each and every shaft. The space to be fed by hand wheel after the clutch has been automatically released need not exceed two or three thousandths of an inch. The purpose of having the screw 34 which engages the dog adjustable is for the same reason that the screw 26 is adjustable, as has been explained above.

The operation is very simple. After the first dogs have performed their work, the shafts 22 and 29 are rotated a certain distance, in this case one-sixth of a revolution, as there are six stop dogs upon each. This brings the second dogs opposite the screws 26 and 34 so that the carriage can be moved up as explained to cut to the proper diameter and when the turning operation is completed the screw 34 comes in contact with the dog 31. As each lateral dog is brought into operative position its respective diameter dog is also brought into operation. For this reason it will be seen that this invention is an important feature in machines of this character not only for the purpose of securing actual measurements, but for the purpose of reducing the time between operations.

While I have illustrated and described a preferred embodiment of the invention I am aware that many modifications can be made therein by any person skilled in the art without departing from the scope of the invention as expressed in the claims. Therefore, I do not wish to be limited to all the details of construction shown and described, but What I do claim is:—

1. The combination with a lathe having a tool slide thereon provided with a stop, of a transverse shaft having a plurality of adjustable stops arranged concentrically around the same and being at the same distance from the center of the shaft as said stop on the slide, whereby at different positions of the shaft one of the stops will be in position to engage said stop on the slide and limit the motion of the slide.

2. The combination with a lathe having a tool slide thereon provided with a projection having a stop, of a rotatable transverse shaft having a plurality of adjustable stops arranged concentrically around the same being at the same distance from the center of the shaft as said projection stop, certain of said stops being in position to limit the position of the slide rearwardly and others to limit its position forwardly.

3. The combination with a lathe having a longitudinally movable carriage and a transversely movable tool slide thereon, of a series of adjustable stops for limiting the position of the slide in one direction, a longitudinal shaft, a feed rod, a series of adjustable stops on the longitudinal shaft for engaging the carriage, and means whereby when the carriage engages one of said stops said longitudinal shaft will be moved and the feed rod will be operated to stop the feed.

4. In a lathe, the combination with a carriage and feed rod, of a shaft having a plurality of adjustable stops thereon adapted to be engaged by said carriage during its travel, means connected with said shaft for operating the feed rod to stop the machine when the shaft is operated by the carriage, and resilient means for returning the shaft to position ready to operate.

5. In a lathe, the combination with a tool carriage having a projection thereon and a feed rod, of a longitudinal rotatable shaft movable lengthwise and having a plurality of adjustable stops arranged around the same all at the same distance from the center and in position to be engaged by said projection when turned into the path thereof, and means connected with, and operated by, said shaft for operating the feed rod to stop the machine.

6. In a lathe, the combination with a tool carriage, of means for stopping the machine after the tool carriage has traveled a certain distance, comprising a longitudinal shaft movable endwise, a series of dogs on said shaft adjustably arranged around the same, each having an adjustable stop thereon, a projection on the carriage having an adjustable stop thereon at the same distance from the center of said shaft as said adjustable stops on the dogs, whereby when said shaft is turned into position for said adjustable stop on the carriage to be in axial alinement with one of said dogs, the movement of the carriage will cause the stop to engage the dog and to move the shaft longitudinally.

In testimony whereof I have hereunto set my hand, in the presence of two subscribing witnesses.

FRED K. HENDRICKSON.

Witnesses:
ALBERT E. FAY,
C. FORREST WESSON.